United States Patent [19]

Cazaux et al.

[11] 3,888,842

[45] June 10, 1975

[54] QUERCETIN DERIVATIVES

[75] Inventors: Michel Cazaux, Pessac; Jean Cros, Ramonville, both of France

[73] Assignee: Societe Cortial, Paris, France

[22] Filed: Aug. 28, 1973

[21] Appl. No.: 392,309

[30] Foreign Application Priority Data
Aug. 31, 1972 France .............................. 72.30873
July 6, 1973 France .............................. 73.24835

[52] U.S. Cl. ............................. 260/210 F; 424/283
[51] Int. Cl. ........................................... C07c 47/18
[58] Field of Search ...................... 260/345.2, 210 F

[56] References Cited
UNITED STATES PATENTS
3,661,890    5/1972    Jurd ............................ 260/345.2 X

*Primary Examiner*—John M. Ford
*Attorney, Agent, or Firm*—Arthur B. Colvin

[57] ABSTRACT

Vicianosyl quercetins, made by reaction of an appropriately substituted quercetin compound with an appropriately substituted vicianosyl derivative followed by removal of the blocking groups, are useful in treating conditions accompanied by capillary fragility or increased capillary permeability.

7 Claims, No Drawings

QUERCETIN DERIVATIVES

This invention relates to quercetin derivatives and their preparation.

The chemical formula of quercetin is

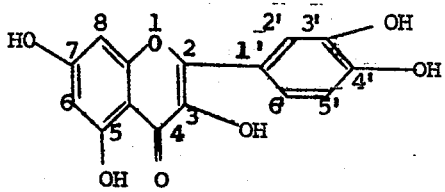

which contains five hydroxyl groups in positions 3, 5, 7, 3' and 4'. A study of the reactivity of these hydroxyl groups to alkylation and glycoxylation has shown that they react in decreasing order of preference in the order 7, 4', 3, 3', 5. In addition, when the positions 7, 4', 3 and 3' are blocked by diverse radicals, the hydroxyl group in position 5 is very unreactive. The syntheses of the present invention are based on this discovery.

The present invention provides a process for the preparation of a quercetin derivative carrying a vicianosyl substituent in at least one of the positions 3, 7 and 4' which comprises reacting a quercetin derivative, carrying at least one free hydroxyl group and in which the other more reactive hydroxyl groups have been blocked by an ester or ether function, with a halogenated derivative of sugar in which the other hydroxyl groups have been etherified, the said sugar derivative being such as to form the aforesaid vicianosyl substituent, and then converting the blocking groups into hydroxyl groups in the product obtained in manner known per se, for example hydrogenolysis in the case of ether radicals and saponification in the case of ester radicals.

Thus, in the new process, a certain number of the hydroxyl groups of quercetin or of a quercetin derivative are blocked by suitably positioned ether or ester substituents and the one or more free hydroxyl groups remaining are reacted with an esterified halogenosaccharide in such a manner that the saccharide residue becomes bonded to the free hydroxyl groups.

In one preferred manner of operating the present invention, a halogeno-acyl vicianose (i.e. an halogenovicianose in which the hydroxyl groups have been esterified) is reacted with a quercetin derivative having at least one free hydroxyl group in positions 3, 7, 3' or 4' and in which the remaining hydroxyl groups in the positions 3, 7, 3' and 4' are blocked by ester and/or ether functions. The ether or ester radicals in the molecule of the product obtained are then converted into hydroxyl groups by known methods such as saponification or hydrogenolysis.

To block the hydroxyl groups of quercertin or a quercetin derivative in accordance with the invention, the aforesaid compound is first completely esterified on all the hydroxyl groups. The product is then reacted with an appropriate quantity of a benzyl halide (in the presence of a catalyst such as potassium carbonate or potassium iodide), and at least one of the aforesaid ester groups is replaced by at least one ether group. AS already indicated, this substitution effects successively the positions 7, 4', 3 and 3'. In this way, one or more of the ester groups can be replaced by one or more ether groups. The product obtained, which contains both ester and ether groups, is then treated so as to convert one of these groups (ester or ether) into a hydroxyl group. For example, the ester groups may be converted into hydroxyl groups by saponification.

Halogeno-acyl vicianose is then made to react with the product obtained, using one or more molecules of the halogeno-acyl vicianose according to the number of hydroxyl groups that are to be substituted. When this reaction is complete, the ester and/or ether groups remaining are converted into hydroxyl groups in known manner such as saponification for the conversion of ester groups and hydrogenolysis for the conversion of ether groups.

This is the manner of operation of the invention which is described in Examples 1 and 2 below. It will be noted that in Example 2 it is necessary, because rutin is used as starting material, and after substitution of at least one ether group for at least one ester group of the deca ester of rutin, to cleave the chemical linkage between the quercetin molecule and the rutinose molecule.

Another manner of realising the invention relates to the attachment of a β-L-arabinopyranosyl-1 radical on a free hydroxyl group situated in position 6 (of the sugar) of iso-quercetin. In this case, 1-halogeno-2,3,4-triacyl β-L-arabinopyranose is used as reagent and is reacted with a molecule of iso-quercetin in which all the hydroxyl groups have been previously blocked by ester and/or ether groups. The starting material is preferably the deca-ester of rutin which is cleaved between the two sugar nuclei.

The present invention also relates to the new products obtained by the aforesaid process, which are vicianosyl quercetin compounds mono- di- or tri-substituted in positions 3, 4' and 7.

The present invention also provides pharmaceutical compositions containing at least one vicianosyl quercetin mono- di- or tri-substituted in positions 3, 4' and 7 in association with a compatible pharmaceutically acceptable carrier. These compositions have a protective effect on the capillaries.

Pharmacological study of the products of the present invention has been carried out by both oral and intraperitoneal administration. The capillary fragility is measured by the method of CHARLIER et al., (Arch. int. physiol, biol. 1963, 71, 1). The reduction in the capillary resistance produced in the rat by a diet poor in vitamin P has been much reduced by the products of the present invention. For example, the $ED_{50}$ (50% active dose) for 3-vicianosyl-quercetin is less than 1 mg./kg., given in a single dosage intraperitoneally, while that of rutin is about 220 mg./kg. These results have been confirmed using the method of LEVOLLAY et al. (Pharmacology of Plant Phenolics, Symposium, Oxford, 1958, 103, 122) on guinea pigs fed with a scorbutogenic diet.

It has been found that the products of the present invention have an effect on capillary permeability. Tests have been carried out on normal rats and guinea-pigs deprived of vitamin C by several techniques: HALPERN et al. (Arch. int. pharm. 1959, 119, 56), LEFEVRE et al. (C.R. Soc., Biol. 1962, 156, 183) and CHARLIER et al. (Arch. int. physiol. biol. 1963, 71, 51). The $ED_{50}$'s obtained with the new compounds are very much less than those obtained with the control compounds such as rutin and 2-ethyl-3-(4-hydroxybenzoyl)-benzofuran.

Toxicity has been measured by administration of various substances as a single dose (intraperitoneally or orally) or by perfusion intravenously. It was found that all the experimental animals (mice, rats and cats) receiving 3-vicianosyl quercetin for example, tolerated doses 100 times greater than the active dose without showing any sign of toxic effects.

Because of their capillary protective properties, the compositions of the invention containing the new quercetin derivatives can be used in human therapy in all pathological conditions accompanied by an increase in capillary fragility or capillary permeability.

The new compounds can be administered rectally or parenterally, for example as tablets containing 1 to 10 milligrams or suppositories containing 5 to 20 milligrams.

The following Examples illustrate the invention.

EXAMPLE 1

3-Vicianosyl quercetin

A mixture of quercetin (30 g.) propionic anhydride (100 ml.) and pyridine (50 ml.) was heated for 6 hours at 80°–90°C. (The propionic anhydride can be replaced by 50 ml. of propionyl chloride). The reaction mixture is then poured into 2 to 3 litres of ice-cold water and the crude pentaester (54 g., m.p. 124°C.) is filtered off and recrystallised from ethyl alcohol, acetone or a mixture of the two. 47 g. of analytically pure penta-ester, m.p. 128°C., are thus obtained.

To 12 g. of quercetin penta-propionate in 150 ml. of methylethylketone, 9 ml. of benzyl bromide, 20 g. of potassium carbonate, and 0.5 g. of potassium iodide are added. The mixture is heated under reflux for 15 hours and then filtered. The solvent is evaporated from the filtrate and a mixture of heptane and toluene is then added to precipitate the desired product. 7,4'-Dibenzyl-3,5,3'-tripropionyl quercetin is thus obtained. It is necessary rigorously to follow the indicated proportions (9 ml. of benzyl bromide for 12 g. of the penta-propionate) and the 15 hour period of heating under reflux if this result is to be obtained, since if the time is reduced only the 7-monobenzyl quercetin is obtained. Also, if more benzyl bromide is used for the same quantity of quercetin penta-propionate, 7,4',3-tribenzyl-5,3'-dipropionyl quercetin is obtained.

The 7,4'-dibenzyl-3,5,3'-tripropionyl quercetin is then saponified with methanolic sodium hydroxide. After recrystallisation of the product 7,4'-dibenzyl quercetin, m.p. 182°C., is obtained in a yield of 4.3 g.

A mixture of 4.8 g. of 7,4'-dibenzyl quercetin, 7 g. of acetobromovicianose, 2 g. of mercuric cyanide, and 1 g. of mercuric bromide is stirred for 12 hours and then heated under reflux for a further 5 hours, the solvent used being a mixture of acetone and nitromethane in equal volumes. If the quantities of reactants are varied, it is possible to obtain 3,3'-di-vicianosyl quercetin.

The reaction mixture is filtered and the filtrate evaporated. The residue is then saponified under an inert atmosphere with 5% aqueous methanolic potassium hydroxide in slight excess. The reaction product is acidified with 10% aqueous acetic acid and then evaporated in vacuo. The concentrated mixture is filtered and the solid isolated is submitted to hydrogenolysis in methanol solution using hydrogen at atmospheric pressure, a temperature between 20° and 40°C., and 5 or 10% palladised charcoal as catalyst. 3.5 g. of crude product are thus obtained which is recrystallised several times from aqueous methanol. 2.5 g. of pure 3-vicianosyl quercetin, m.p. 203°C., are finally obtained.

A purified sample of 3-vicianosyl quercetin can also be obtained by chromatography of the crude product in methanol solution on a column of polyamide prepared in pure benzene.

Spectroscopic and analytical analysis show the purity of the product obtained. The NMR spectrum (using DMSO d6 as solvent) and ultra-violet spectrum (in ethanol) are completely in accordance with the proposed structure.

EXAMPLE 2

7-vicianosyl quercetin

A mixture of 60 g. of rutin, 200 ml. of acetic anhydride and 20 g. of dry sodium acetate (or 100 ml. of pyridine or a mixture of sodium acetate and pyridine) is heated for 10 hours with stirring at 80°–90°C. The reaction mixture is then poured into 2 to 3 litres of water and extracted with ethyl acetate. The organic phase is washed, dried and evaporated to give 90 g. of crude product which is recrystallised from aqueous alcohol or aqueous acetone. 75 g. of rutin deca-acetate, m.p. 148°C., are obtained which is analytically pure as shown by infra-red, NMR and UV spectra and elementary microanalysis.

A solution of 20 g. of this deca-acetate, 5 ml. of benzyl chloride, 8 g. of potassium carbonate and 1 g. of potassium iodide are heated under reflux for 20 hours. The crude product obtained after filtration and evaporation of the solvent is treated for 1 hour under reflux with a solution of hydrogen chloride in ethanol, which simultaneously hydrolysises the remaining acetate groups and cuts the O-rhamnoside bond in the 3-position of the flavone. 7-Benzyl quercetin is thus obtained after removal of the ethanol and hydrochloric acid in vacuo.

The crude reaction product is then esterified with acetic anhydride in the presence of sodium acetate. 7-Benzyl quercetin tetra-acetate is thus obtained which is purified by recrystallisation from a mixture of benzene and hexane. Hydrogenolysis of this compound under the conditions previously described gives 5,3,3',4'-quercetin tetra-acetate which is then condensed with acetobromovicianose under the same conditions as those described in Example 1. After recrystallisation of the product obtained, it is saponified under an inert atmosphere with aqueous methanolic potassium hydroxide and the 7-vicianosyl quercetin obtained is extracted as previously described. It is then recrystallised and if necessary purified by chromatography on a polyamide as previously mentioned.

EXAMPLE 3

3-Vicianosyl quercetin

Rutin deca-acetate (10 g.) is dissolved in chloroform (50 cc.) and treated for 12 hours at ambient temperature with gaseous hydrogen bromide added slowly bubble by bubble to the solution. After the reaction, quercetin precipitates during the cleaving of the rutin deca-ester. The chloroform solution obtained is filtered and, after evaporation of the chloroform, 3 g. of a partially deacetylated derivative of iso-quercetin is obtained. These 3 grams of product are mixed with 2.1 g. of anhydrous potassium carbonate and 2 cc. of benzyl chloride in 100 cc. of dry acetone, and then refluxed for 48 hours. After saponification of the remaining ester functions, 7,3',4'-tribenzyl-iso-quercetin is obtained.

5 g. of 7,3',4'-tribenzyl-iso-quercetin are dissolved in 6 cc. of pyridine and treated successively with 2.4 g. of chlorotriphenylmethane (trityl chloride) for 2 hours at 80°C., and then with 6 cc. of acetic anhydride for 12 hours at ambient temperature. 7 g. of 7,3',4'-tribenzyl-3-[β-D-(0-6-trityl-2,3,4-triacetyl)-glucopyranoxyl]quercetin are obtained and the trityl groups are removed by treatment in 40 cc. of acetic acid with 1.2 cc. of 33% hydrogen bromide in acetic acid followed by 10 cc. of nitromethane, 0.8 g. of mercuric cyanide and 1 g. of 1-bromo-2,3,4-tribenzoyl-β-L-arabinopyranose for 6 hours at ambient temperature.

After saponification of the ester groups and hydrogenolysis of the benzyl groups α-L-arabinosido (1 → 6) β-D-glucopyranosyl-3-quercetin, or 3-vicianosyl quercetin, is obtained. The yield is 80% based on the 7,3',4'-tribenzyl-iso-quercetin.

EXAMPLE 4

4-Vicianosyl quercetin

It is also possible to start from a mixed deca-ester of rutin. Thus, it is also possible to protect the phenolic hydroxyl groups of rutin by a group stable under the conditions of cleavage between the saccharides. For example, para-nitrobenzoyl chloride in excess reacts with rutin in a basic aqueous medium to give a 5,7,3',4'-tetra-ester. The latter is treated with an acid anhydride or chloride (for example acetic or propionic anhydride or chloride) to give a mixed deca-ester. Cleavage of the latter by an appropriate reagent, for example boron trifluoride-diethyletherate gives a derivative of iso-quercetrin in which the phenolic hydroxyl groups remain esterified.

2 g. of rutin are dissolved in 130 cc. of a 10% solution of potassium bicarbonate and treated with 16 g. of para-nitrobenzoyl chloride. After reaction for 1 hour, the precipitate formed is filtered off, dried, and acetylated in 5 cc. of dry pyridine with 5 cc. of acetic anhydride. 4.4 g. of the 5,7,3',4'-tetra-para-nitrobenzoate of hexaacetylrutinosyl-3-quercetin are thus obtained which are dissolved in 15 cc. of chloroform and treated with 6 cc. of boron trifluoride diethyletherate. 3.5 g. of derivative of iso-quercetrin in which the phenolic hydroxyl groups remain esterified are obtained.

Cleavage starting from a mixed deca-ester has the advantage of preserving the esterified phenolic hydroxyl groups, which avoids the step of benzylation and hydrogenation.

We claim:

1. Quercetin substituted in one or more of positions, 3, 7 and 4' by the vicianosyl group.

2. The quercetin compound according to claim 1 which is 4'-vicianosyl quercetin.

3. The quercetin compound according to claim 1 which is 3-vicianosyl quercetin.

4. The quercetin compound according to claim 1 which is 3,4'-divicianosyl quercetin.

5. The quercetin compound according to claim 1 which is 7-vicianosyl quercetin.

6. The quercetin compound according to claim 1 which is 7,4'-divicianosyl quercetin.

7. The quercetin compound according to claim 1 which is 3,7,4'-trivicianosyl quercetin.

* * * * *